3,535,323
AMIDES OF ISOINDOLINE-2-CARBOXYLIC ACID
Karl-Heinz Heidenbluth, Radebeul, Reingard Scheffler, Dresden, Joachim Schmidt, Magdeburg, and Heinz Tonjes, Radebeul, Germany, assignors to VEB Arzneimittelwerk Dresden, Dresden-Radebeul, Germany
No Drawing. Continuation-in-part of application Ser. No. 447,117, Apr. 8, 1965. This application Apr. 4, 1968, Ser. No. 718,935
Int. Cl. C07d 27/48
U.S. Cl. 260—294                    15 Claims

ABSTRACT OF THE DISCLOSURE

Compounds having a high order of analgesic and sedative properties of the formula

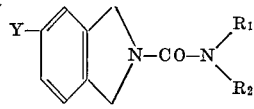

in which Y stands for hydrogen, a nitro group or an amino group, and $R_1$ and $R_2$ are each of the group consisting of hydrogen, lower alkyl, alkenyl to $C_3$, lower hydroxyalkyl, cycloalkyl or aryl radicals, and $R_1$ together with $R_2$ and the N of the amino group may form a 5-to 6-membered ring.

---

This application is a continuation-in-part of our copending application Ser. No. 447,117, filed Apr. 8, 1965, now abandoned.

This invention relates to novel amides of iso-indoline-2-carboxylic acid and more particularly pertains to amides of iso-indoline-2-carboxylic acid which can be obtained by ordinary industrial methods and which show a high order of analgesic and sedative properties over an extended period of time. These compounds are described by a general formula

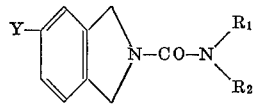

in which Y stands for hydrogen, a nitro group or an amino group, and $R_1$ and $R_2$ are each of the group consisting of hydrogen, lower alkyl, alkenyl to $C_3$, lower hydroxyalkyl, cycloalkyl, or aryl radicals and $R_1$ together with $R_2$ and the N of the amino group may form a 5-to-6-membered ring.

From this series, only the simple amide of isoindoline-2-carboxylic acid has been known up to date. This simple amide of iso-indoline-2-carboxylic acid was obtained by reacting cyanogen bromide with N-allyl-iso-indoline with subsequent saponification of the resulting iso-indoline-2-carboxylic acid nitrile; the yield of the first stage was 40% of the theoretical; the yield of the second stage is not mentioned.

The new compounds of this invention are obtained by reacting an iso-indoline of the general formula

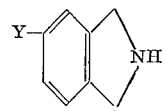

in which Y represents a hydrogen atom or a nitro group, with isocyanates, carbamic acid chlorides, reactive urea derivatives or phosgene in a manner known per se. In the case in which iso-indoline-2-carboxylic acid chloride is obtained it is subjected to aminolysis. In the case when Y represents a nitro group, the aromatic nitro group may be reduced to an amino group. The amide is thus easily obtainable in one stage, and it has been found that by using this process a greatly increased yield was obtained as compared to the only 40% of the theoretical yield for the first stage previously obtained. When Y=H and both $R_1$ and $R_2$=H, up to 74% of the theoretical yield has been obtained.

It is accordingly an object of this invention to provide new amides of iso-indoline-2-carboxylic acid of the general formula

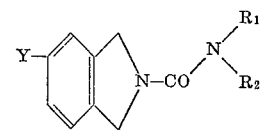

in which Y=H, $NO_2$ or $—NH_2$ and $R_1$ and/or $R_2$ stand for H, lower alkyl, alkenyl to $C_3$, lower hydroxyalkyl, cycloalkyl or aryl radicals and $R_1$ together with $R_2$ and the N of the amino group may form a 5-to-6 membered ring, by reacting an iso-indoline of the general formula

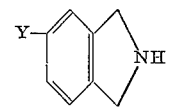

in which Y represents a hydrogen atom or a nitro group, with isocyanates, carbamic acid chlorides, reactive urea derivatives or phosgene in a known manner and in the cases where iso-indoline-2-carboxylic acid chlorides are obtained subjecting them to subsequent aminolysis. It is a further object of this invention to obtain iso-indoline-2-carboxylic acid amides with specially good analgesic and sedative properties over an extended length of time.

It should be noted that $R_1$ and $R_2$ which are mentioned to consist of lower alkyl or lower hydroxyalkyl preferably stand for alkyls of the chain-length $C_1$ to $C_4$. In many cases Y stands for hydrogen; $R_1$ and/or $R_2$ may also be hydrogen. As regards the aryl radical, the preferred radicals are phenyl and benzyl.

In order that the compounds of this invention be readily appreciated by and fully available to those skilled in the art, the following illustrative but not limiting examples of the preparations thereof are supplied.

EXAMPLE 1

To a solution of 5 g. iso-indoline in 70 ccs. of dry acetone a solution of 5 g. phenyl isocyanate in 30 ccs. acetone is added dropwise, while stirring over a period of fifteen minutes. The solution is left overnight; the mother liquor is filtered off and concentrated in vacuo. The resulting crystallisate of iso-indoline-2-carboxylic acid anilide is recrystallized from ethanol. Yield: 3.5 g.=35% of the theoretical yield; melting point 187–188° C. $C_{15}H_{14}N_2O$ (238.28): $N_{calc.}=11.75\%$, $N_{found}=11.59$.

EXAMPLE 2

5 g. of 5-nitroisoindoline are reacted with 1.7 g. methyl-iso-cyanate, as described in Example 1; Yield: 4 g. 5-nitro-iso-indoline-2-carboxylic acid methylamide=60% of the theoretical yield; melting point undefined; decomposition from 260° C. $C_{10}H_{11}N_3O_3$ (221.21): $N_{calc.}=19.0\%$, $N_{found}=19.17\%$.

From this, 2.3 g. 5-amino-iso-indoline-2-carboxylic acid methylamide are obtained by catalytic hydrogenation with PdO as actalyst in ethanol under normal conditions. Yield: 60.5% of the theoretical yield; melting point 199–202° C., elimination of water at 97° C. to 100° C. $C_{10}H_{13}N_3O.H_2O$ (209.25): $N_{calc}=20.08\%$, $N_{found}=19.79\%$.

EXAMPLE 3

8.5 g. iso-indoline are reacted with 9.3 benzyl isocyanate as described in Example 1. Yield: 7 g. iso-indoline-2-carboxylic acid benzylamide which represents 39% of hte theoretical yield; melting point 137° C. (ethanol). $C_{16}H_{16}N_2O$ (252.16): $N_{calc.}=11.11\%$, $N_{found}=10.96\%$.

EXAMPLE 4

6.78 g. of 5-nitro iso-indoline are reacted with 5.1 g. cyclohexyl isocyanate as described in Example 1. Yield: 6.4 g. 5-nitro iso-indoline-2-carboxylic acid cyclohexylamide which represents 53.8% of the theoretical yield; melting point 141° C. (ethanol). $C_{15}H_{19}N_3O_3$ (289.54): $N_{calc.}=14.51\%$, $N_{found}=14.30\%$.

The hydrochloride of 5-amino-iso-indoline-2-carboxylic acid cyclohexylamide is obtained by catalytic hydrogenation. Melting point 207–209° C. (ethanol/ether). $C_{15}H_{22}ClN_3O$ (295.81): $N_{calc.}=14.21\%$, $N_{found}=14.10\%$.

EXAMPLE 5

To a mixture of 4 g. iso-indoline, 4 ccs. triethylamine and 50 ccs. chloroform, a solution of 3.6 g. dimethyl carbamic acid chloride in 20 ccs. chloroform is added dropwise, while stirring, at room temperature. The mixture is subsequently refluxed for five hours. After distilling off the solvent in vacuo, the residue is shaken with 50 ccs. diluted HCl; the iso-indoline-2-carboxylic acid dimethylamide separated is drawn off and recrystallized from water. Yield: 3.5 g.=56% of the theoretical yield, melting point 130° C. $C_{11}H_{14}N_2O$ (190.24): $N_{calc}=14.72\%$, $N_{found}=14.49\%$.

EXAMPLE 6

To a mixture of 4.75 g. 5-nitro iso-indoline, 2.3 pyridine, and 50 ccs. chloroform, a solution of 6.57 g. diphenyl carbamic acid chloride in 50 ccs. chloroform is added dropwise, while stirring, at room temperature. The mixture is subsequently heated to 50–70° C. for five hours. The cooled reaction mixture is extracted with 100 ccs. 0.5 N HCl in three portions, washed with water and the dried chloroform phase freed from the solvent in vacuo. The solid residue of crude 5-nitro-iso-indoline-2-carboxylic acid diphenylamide is recrystallized from ethanol. Yield: 7.5 g.=73% of the theoretical yield. Melting point 160.5–161.5° C. $C_{21}H_{17}N_3O_3$ (359.37): $N_{calc.}=11.69\%$, $N_{found}=11.81\%$.

3.75 g. of hydrochloride of 5-amino-iso-indoline-2-carboxylic acid diphenylamide are obtained by catalytic hydrogenation. Yield: 54.4% of the theoretical yield. Melting point 21° C. (ethanol/ether). $C_{21}H_{20}ClN_3O$ (365.85): $N_{calc}=11.49\%$, $N_{found}=11.52\%$.

EXAMPLE 7

5.95 g. iso-indoline are mixed by stirring in 60 ccs. water, and 5.25 g. nitro urea are introduced by portions. The crystals which are separated after approximately ten minutes, are drawn off, heated to melting point over a short period to remove the $N_2O$ formed during the reaction and then recrystallized from water. Yield 6 g. iso-indoline-2-carboxylic acid amide which represents 74% of the theoretical yield; melting point 185–186° C. $C_9H_{10}N_2O$ (162.19): $N_{calc.}=17.27\%$, $N_{found}=17.19\%$.

EXAMPLE 8

4.1 g. 5-nitro-iso-indoline are reacted with 3.2 g. nitro urea as described in Example 5. Yield: 3.7 g. 5-nitro-iso-indoline-2-carboxylic acid amide=72% of the theoretical yield; melting point 193–194° C. (water). $C_9H_9N_3O_3$ (207.19): $N_{calc.}=20.28\%$, $N_{found}=20.13\%$.

From this, 2.7 g. 5-amino-iso-indoline-2-carboxylic acid amide are obtained by catalytical hydrogenation; Yield: 87% of the theoretical yield; melting point 201–202° C. (ethanol). $C_9H_{11}N_3O$ (177.20); $N_{calc.}=23.72\%$, $N_{found}=23.73\%$.

EXAMPLE 9

To a solution of iso-indoline in toluene, an excess of phosgene is introduced, while stirring, at room temperature. The solution is subsequently heated to 80°–90° C. for one to two hours. After cooling, the insoluble matter is filtered off, the filtrate is concentrated in vacuo, and the residue is recrystallized from benzene/petroleum ether. The iso-indoline-2-carboxylic acid chloride obtained having a melting point of 125–127° C., is reacted as follows: To a mixture of 1.6 g. piperidine, 2 g. triethylamine and 30 ccs. acetone, a solution of 3.5 g. iso-indoline-2-carboxylic acid chloride in 140 ccs. acetone is added dropwise, while stirring. The mixture is subsequently refluxed for one hour. After cooling, the triethylamine hydrochloride is drawn off, mixed with 35 ccs. of diluted HCl, and the major portion of acetone distilled off in vacuo. During cooling, 4.1 g. iso-indoline-2-carboxylic acid piperidide crystallized from the remaining solution, which represents 93% of the theoretical yield. Melting point 70–71° C. (acetone). $C_{14}H_{18}N_2O$ (230.30); $N_{calc.}=12.16\%$, $N_{found}=11.94\%$.

EXAMPLE 10

To a mixture of 4.52 g. diethylamine, 6.26 g. triethylamine, and 50 ccs. acetone, a solution of 14.0 g. 5-nitro-iso-indoline-2-carboxylic acid chloride (having a melting point of 120° C.), made as described in Example 9, in 125 ccs. acetone is added dropwise, while stirring, at room temperature over a period of twenty minutes. The mixture is subsequently heated to boiling for two hours. After cooling, triethylamine hydrochloride is drawn off; the filtrate is mixed with 50 ccs. of diluted HCl, and the major portion of the solvent is distilled off in vacuo. From the remaining solution, crude 5-nitro-iso-indoline-2-carboxylic acid diethylamide crystallizes, which is recrystallized with ethanol for purification, and washed with 300 ccs. water on the frit. Yield: 13.6 g.=83.7% of the theoretical yield; melting point 90–91° C. (benzene/ether). $C_{13}H_{17}N_3O_3$ (263.29): $N_{calc.}=15.96\%$, $N_{found}=15.60\%$.

From this, the hydrochloride of 5-amino iso-indoline-2-carboxylic acid diethylamide is obtained by catalytic hydrogenation. Melting point (not clearly defined) from 178–188° C. (ethanol/ether). $C_{13}H_{20}ClN_3O$ (269.77): $N_{calc.}=15.57\%$, $N_{found}=15.24\%$.

Further examples are contained in tabulated form in the following table:

TABLE 1

| | Y | $R_1$ | $R_2$ | Boiling point, °C. (solvent) | Formula mol (weight) | N-determination cal./ found |
|---|---|---|---|---|---|---|
| Example No.: | | | | | | |
| 11 | H | —H | —$CH_3$ | 210 (Ethanol) | $C_{10}H_{12}N_2O$ (176.20) | 15.89/15.68 |
| 12 | H | —H | —$C_2H_5$ | 223 (Ethanol) | $C_{11}H_{14}N_2O$ (190.24) | 14.72/14.66 |
| 13 | H | —H | —$iC_3H_7$ | 129–130 (Ethanol) | $C_{12}H_{16}N_2O$ (204.17) | 13.72/13.76 |
| 14 | H | —H | —$iC_4H_9$ | 82 Petroleum ether | $C_{13}H_{18}N_2O$ (218.28) | 12.82/13.14 |
| 15 | H | —H | —$CH_2$—CH=$CH_2$ | 198–199 (Ethanol) | $C_{12}H_{14}N_2O$ (202.24) | 13.85/13.72 |
| 16 | H | —H | —$CH_2$—$CH_2$—OH | 185–186 | $C_{11}H_{14}N_2O_2$ (206.24) | 13.58/13.55 |
| 17 | H | —$iC_4H_9$ | —$iC_4H_9$ | 115–116 (Ethanol) | $C_{19}H_{32}N_2O$ (320.46) | 8.75/8.68+ |
| 18 | H | —$C_6H_5$ | —$C_6H_5$ | 173 (Ethanol) | $C_{21}H_{18}N_2O$ (314.37) | 8.91/8.93 |
| 19 | H | | cyclopentyl–H | 108–109 (Acetone) | $C_{13}H_{16}N_2O$ (216.27) | 12.95/12.69 |
| 20 | H | | cyclopentyl–H | 137–138 (Acetone) | $C_{13}H_{16}N_2O_2$ (232.27) | 12.06/11.78 |
| 21 | H | | cyclohexyl–H | 113 (Acetic acid ester) | $C_{15}H_{20}N_2O$ (244.32) | 11.46/11.37 |
| 22 | —$NO_2$ | —H | —$C_2H_5$ | 243–244 (Ethanol) | $C_{11}H_{13}N_3O_3$ (235.24) | 17.86/17.68 |
|    | —$NH_2$ | —H | —$C_2H_5$ | 60–62 (Water) | $C_{11}H_{15}N_3O$ (205.25) | 20.48/20.16 |
| 23 | —$NO_2$ | —H | —$CH_2$—CH=$CH_2$ | 225–226 (Ethanol) | $C_{12}H_{13}N_3O_3$ (247.25) | 16.99/16.81 |
|    | —$NH_2$ | —H | —$CH_2$—CH=$CH_2$ | 128–129 (Propanol petroleum ether) | $C_{12}H_{15}N_3O$ (217.26) | 19.30/19.36 |
| 24 | —$NO_2$ | —H | $iC_3H_7$ | 186–187 (Acetic acid ester) | $C_{12}H_{15}N_3O_3$ (249.48) | 16.84/16.84 |
|    | —$NH_2$ | —H | $iC_3H_7$ | 193–194 (Ethanol ether) | $C_{12}H_{18}ClN_3O$ (255.83) | 16.42/16.15 |
| 25 | —$NO_2$ | —H | —$C_6H_5$ | 211–212 (Ethanol) | $C_{15}H_{13}N_3O_3$ (283.28) | 14.84/14.96 |
|    | —$NH_2$ | —H | —$C_6H_5$ | 166–167 (Ethanol) | $C_{15}H_{15}N_3O$ (253.29) | 16.59/16.69 |
| 26 | —$NO_2$ | —H | —$CH_2$—$C_6H_5$ | 168–170 (Ethanol) | $C_{16}H_{15}N_3O_3$ (297.30) | 14.14/14.31 |
|    | —$NH_2$ | —H | —$CH_2$—$C_6H_5$ | 71–72 (Ethanol) | $C_{16}H_{23}N_3O$ (313.39) | 13.41/13.60+ |
| 27 | —$NO_2$ | —$CH_3$ | —$CH_2$—$C_6H_5$ | 159 Water | $C_{11}H_{13}N_3O_3$ (235.24) | 17.86/17.60 |
|    | —$NH_2$ | —$CH_3$ | —$CH_3$ | 209–211 (Ethanol) | $C_{11}H_{16}ClN_3O$ (241.72) | 17.39/17.23 |
| 28 | —$NO_2$ | | cyclopentyl–H | 158–159 (Ethanol) | $C_{13}H_{15}N_3O_3$ (261.27) | 16.08/16.12 |
|    | —$NH_2$ | | cyclopentyl–H | 147–148 (Ethanol) | $C_{13}H_{17}N_3O$ (231.29) | 18.17/18.45 |
| 29 | —$NH_2$ | | cyclohexyl–H | 131–132 (Benzene petroleum ether) | $C_{14}H_{19}N_3O$ (245.31) | 17.15/117.13 |
|    | —$NO_2$ | | cyclohexyl–H | 129–130 (Ethanol) | $C_{14}H_{17}N_3O_3$ (275.27) | 15.26/15.36 |
| 30 | —$NO_2$ | —H | —$iC_4H_9$ | 184–185 (Ethanol) | $C_{13}H_{17}N_3O_3$ (263.29) | 15.96/15.93 |
|    | —$NH_2$ | —H | —$iC_4H_9$ | 225 (Ethanol ether) | $C_{13}H_{20}ClN_3O$ (269.77) | 15.65/15.66 |

+Compounds 17 and 26 crystallize with 1 Mol ethanol.

In the following table, a number of pharmaceutical data are listed for the purpose of illustrating the effectiveness of some of the new products as compared to known drugs. The data were collected in tests carried out on mice.

TABLE 2

| | | Analgesic effect | | Antipyretic effect in fevering rats; lower $LD$, mg./kg. | Antiphlogistic effect; lower LD, mg./kg. | |
|---|---|---|---|---|---|---|
| | $LD_{50}$, mg./kg. | $ED_{50}$, mg./kg. Electric | $LD_{50}$:$ED_{50}$ Tail irritation | | Dextran-edema | Formalin edema |
| Iso-indoline-2-carboxylic acid amide | 620 | 50 | 12.4 | 10 | 20 | 20 |
| Iso-indoline-2-carboxylic acid methylamide | 360 | 45 | 8.0 | 10 | 10 | 50 |
| Iso-indoline-2-carboxylic acid dimethylamide | 410 | 55 | 7.5 | 10 | 20 | 20 |
| Aminophenazone | 320 | 120 | 2.7 | 20 | 100 | 100 |
| Phenylbutazone sodium | 260 | 145 | 1.8 | 50 | 150 | 150 |

What is claimed is:
1. A compound of the formula

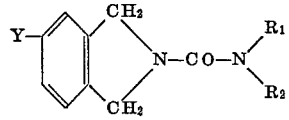

wherein Y is a member selected from the group consisting of hydrogen, nitro, and amino, and $R_1$ and $R_2$ are each a member selected from the group consisting of H, lower alkyl, allyl, hydroxy-lower alkyl, cyclohexyl and phenyl, and when taken together with the adjacent N atom a member selected from the group consisting of pyrrolidino, piperidino and morpholino, with the proviso that Y, $R_1$ and $R_2$ are not simultaneously hydrogen.

2. The compound as claimed in claim 1, wherein Y stands for hydrogen, $R_1$ is hydrogen and $R_2$ is phenyl.

3. The compound as claimed in claim 1, wherein Y stands for $NH_2$, $R_1$ is hydrogen and $R_2$ is methyl.

4. The compound as claimed in claim 1, wherein Y stands for hydrogen, $R_1$ is hydrogen and $R_2$ is benzyl.

5. The compound as claimed in claim 1, wherein Y stands for $NO_2$, $R_1$ is hydrogen and $R_2$ is cyclohexyl.

6. The compound as claimed in claim 1, wherein Y stands for $NH_2$, $R_1$ is hydrogen and $R_2$ is cyclohexyl.

7. The compound as claimed in claim 1, wherein Y stands for hydrogen, $R_1$ and $R_2$ are methyl.

8. The compound as claimed in claim 1, wherein Y is $NO_2$, $R_1$ and $R_2$ are phenyl.

9. The compound as claimed in claim 1, wherein Y is $NO_2$, $R_1$ and $R_2$ each are hydrogen.

10. The compound as claimed in claim 1, wherein Y is $NH_2$, $R_1$ and $R_2$ each are hydrogen.

11. The compound as claimed in claim 1, wherein Y stands for hydrogen, $R_1$ and $R_2$ together with the N of the amino-group is piperidino.

12. The compound as claimed in claim 1, wherein Y stands for $NH_2$, $R_1$ and $R_2$ each are ethyl.

13. The compound as claimed in claim 1, wherein Y stands for $NO_2$, $R_1$ is hydrogen and $R_2$ is methyl.

14. The compound as claimed in claim 1, wherein Y stands for $NH_2$, $R_1$ and $R_2$ are phenyl.

15. The compound as claimed in claim 1, wherein Y stands for $NO_2$, $R_1$ and $R_2$ each are ethyl.

References Cited

UNITED STATES PATENTS

| | | | |
|---|---|---|---|
| 3,285,908 | 11/1966 | Shen | 260—211 |
| 3,308,130 | 3/1967 | Bousquet | 260—294 |

FOREIGN PATENTS 3,661   12/1965   France.

OTHER REFERENCES

Neumeyer: J. Pharm. Sci., 53 (8), 981–2 (1964).

HENRY R. JILES, Primary Examiner

G. T. TODD, Assistant Examiner

U.S. Cl. X.R.

260—247.2, 326.1; 424—248, 267, 274